US009376217B2

(12) United States Patent
Yamakoshi et al.

(10) Patent No.: US 9,376,217 B2
(45) Date of Patent: Jun. 28, 2016

(54) JIG FOR FORMING SEALANT LAYER FOR LIGHTNING PROTECTION FASTENER, METHOD FOR FORMING SEALANT LAYER FOR LIGHTNING PROTECTION FASTENER, LIGHTNING PROTECTION FASTENER, AND WING OF AIRCRAFT (71) Applicant: MITSUBISHI AIRCRAFT CORPORATION, Aichi (JP)

(72) Inventors: Hideo Yamakoshi, Aichi (JP); Yuji Asahara, Aichi (JP); Wataru Nishimura, Tokyo (JP); Takeyasu Tarumi, Tokyo (JP); Noritomo Takata, Tokyo (JP); Jun Kawaguchi, Tokyo (JP); Hiroshi Rikukawa, Tokyo (JP); Tomonori Okumura, Aichi (JP); Kengo Nomiya, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 209 days.

(21) Appl. No.: 14/166,278

(22) Filed: Jan. 28, 2014

(65) Prior Publication Data
US 2015/0298819 A1  Oct. 22, 2015

(30) Foreign Application Priority Data

Jan. 29, 2013 (JP) .................................. 2013-14092

(51) Int. Cl.
*B64D 45/02* (2006.01)
*F16B 37/14* (2006.01)
*F16B 33/00* (2006.01)
*B23P 11/00* (2006.01)

(52) U.S. Cl.
CPC ................. *B64D 45/02* (2013.01); *B23P 11/00* (2013.01); *F16B 33/004* (2013.01); *F16B 37/14* (2013.01)

(58) Field of Classification Search
CPC ..... B23P 2700/01; B23P 11/00; B32B 37/18; B32B 37/153; B32B 37/12; B32B 37/0076; B32B 2435/00; B64D 45/02; F16B 37/14; F16B 43/001; F16B 33/004; G01R 31/008; G01R 31/001; H05K 9/0067; H05K 9/0079; Y10T 29/49895; Y10T 29/49622; Y10T 29/49948; Y10T 29/4998; Y10T 29/49982; Y10T 29/49993
See application file for complete search history.

(56) References Cited

U.S. PATENT DOCUMENTS

| | | | | |
|---|---|---|---|---|
| 5,749,670 A | * | 5/1998 | Astor ...................... | F16B 37/14 29/525.14 |
| 2009/0147429 A1 | * | 6/2009 | Martin Hernandez . | B64D 45/02 361/218 |
| 2012/0074257 A1 | * | 3/2012 | Bessho ................... | B64D 45/02 244/1 A |

(Continued)

FOREIGN PATENT DOCUMENTS

JP   2010-254287 A   11/2010

*Primary Examiner* — Alexander P Taousakis
(74) *Attorney, Agent, or Firm* — Pearne & Gordon LLP (57) ABSTRACT To provide a jig for forming a sealant layer for a lightning protection fastener which enables to quickly and accurately obtain a sealant layer having a required thickness. A guide jig 30 is used to form a sealant layer 29 around a fastener member 24 that passes through and fastens a plurality of members constituting an airframe of an aircraft, the jig including: a cup 31 including a cavity 33 to be filled with an uncured sealant 28; and a guide that is provided within the cavity 33 and engaged with the fastener member 24 so as to match a center axis of the cavity 33 with a center axis of the fastener member 24.

3 Claims, 7 Drawing Sheets

(56) References Cited

U.S. PATENT DOCUMENTS

| | | | |
|---|---|---|---|
| 2012/0155987 A1* | 6/2012 | Watanabe | F16B 37/14 411/337 |
| 2013/0153136 A1* | 6/2013 | Day | F16J 15/14 156/242 |
| 2013/0186552 A1* | 7/2013 | Asahara | F16B 39/225 156/92 |
| 2014/0091175 A1* | 4/2014 | Yoon | B64D 45/02 244/1 A |
| 2014/0209736 A1* | 7/2014 | Nishimura | B64D 45/02 244/1 A |
| 2014/0234050 A1* | 8/2014 | Asahara | B64D 45/02 411/371.1 |
| 2015/0184688 A1* | 7/2015 | Dobbin | F16B 39/021 411/82.1 |
| 2015/0271960 A1* | 9/2015 | Yoon | H05K 9/0067 174/138 C |

\* cited by examiner

JIG FOR FORMING SEALANT LAYER FOR LIGHTNING PROTECTION FASTENER, METHOD FOR FORMING SEALANT LAYER FOR LIGHTNING PROTECTION FASTENER, LIGHTNING PROTECTION FASTENER, AND WING OF AIRCRAFT

BACKGROUND OF THE INVENTION

1. Field of the Invention

The present invention relates to a jig for forming a sealant layer for a lightning protection fastener used in an airframe of an aircraft, and more particularly, used in a wing.

2. Description of the Related Art

In general, a wing constituting an airframe of an aircraft has a hollow structure. A wing panel forming a wing surface is fixed to a structural member inside of the wing by a fastener member.

The fastener member fastens the wing panel to the structural member by inserting a pin-shaped fastener body into through holes respectively formed in the wing panel and the structural member inside the wing from outside of the wing, and fixing a distal end portion of the fastener body by using a fixture such as a collar and a nut from inside of the wing.

A structural member other than the wing panel, a member for fixing accessories or the like are also fastened and fixed by the fastener member inside the wing or a fuselage portion.

In aircrafts, all possible lightning protection measures need to be taken by giving lightning protection capability to the fastener member.

That is, when aircrafts are struck by lightning and high current flows through the wing panel and the structural member of a main wing or the like, the high current partly or, in some cases, entirely flows through a fastened portion fastened by the fastener member including the fastener body and the fixture. If the current has a value exceeding a limit value of passage allowable current in each fastened portion, electric discharge called electric arc (or thermal spark) occurs (the electric discharge is referred to as arc below in the present specification). This is a phenomenon in which a rapid temperature rise occurs in a fastened interface between members mainly made of a conductive material and constituting the fastened portion due to the current passing through the fastened portion, thereby causing the members to locally melt, and electric discharge to occur in the surrounding atmosphere. In many cases, high-temperature melts called hot particles scatter from the melting portion.

An inner space of the wing generally doubles as a fuel tank. It is thus necessary to take explosion protection measures on the fuel tank so as to prepare for lightning strikes. When the above arc or hot particles have energy exceeding a certain level, the arc or hot particles could ignite fuel vapor in the fuel tank. Therefore, in the lightning strikes, by taking double redundant measures of (1) suppressing the occurrence of arc in the fastened portion, and (2) sealing the arc, the arc discharge needs to be prevented from occurring, and the hot particles scattering therefrom need to be prevented from contacting the flammable fuel vapor to thereby prevent ignition. Here, examples of a portion where the flammable fuel vapor possibly exists include an inner portion of the fuel tank inside the wing and inside the fuselage portion, an inner portion of a surge tank (where a vent scoop, a burst disk or the like are placed) generally placed on a wing tip side of the fuel tank, and an inner portion of fuel-system accessories. To prevent the occurrence of arc in the fastened portion, bonding is performed so as to improve electrical conductivity between the fastener member and the structural member. Surface bonding is performed in a case of high current. Fastener bonding is performed (a conductive fastener is used as the fastener) when the current has a value within a medium region. A metal fastener may be simply used in a case of low current.

As a method for sealing the arc, a configuration in which a cap made of an insulating material is attached so as to cover a required portion of a fastener member, and an inner portion of the cap is filled with a sealant so as to fill a gap between the fastener member and the cap has been proposed (e.g., Japanese Patent Laid-Open No. 2010-254287). However, when the cap is mounted, a fastener portion for mounting is required. It is thus necessary to extend the length of a fastener body. Since a great number of fastener members are provided in an aircraft, the weight of the aircraft is increased. Fuel consumption is thereby deteriorated.

When the fastener member is attached to a narrow portion with a small space therearound, a space for mounting the cap may not be ensured.

A method for ensuring lightning protection capability by overlaying an insulating sealant layer on a fastener member without attaching the cap has been also applied. However, workers form the sealant layer based on visual observation. It is thus not easy to accurately form the sealant layer having a required thickness for ensuring the lightning protection capability around the fastener member.

In view of the above problems, a main object of the present invention is to provide a jig for forming a sealant layer for a lightning protection fastener which enables to quickly and accurately form a sealant layer having a required thickness around a fastener member.

SUMMARY OF THE INVENTION

To achieve the above object, a jig for forming a sealant layer according to the present invention is a jig for use to form an insulating sealant layer around a fastener member that passes through and fastens a plurality of members constituting an airframe of an aircraft, the jig including: a cup including a cavity to be filled with an uncured sealant; and a guide that is provided within the cavity and engaged with the fastener member so as to match a center axis of the cavity with a center axis of the fastener member.

In accordance with the jig of the present invention, the cup can be determined in position with respect to the fastener member by using the guide. Therefore, the sealant layer having a required thickness can be quickly and accurately formed around the fastener member.

A rod-shaped guide pin may be used for the guide of the jig according to the present invention.

The center axis of the cavity to be filled with the sealant and the center axis of the fastener member can be matched with each other by providing the rod-shaped guide pin.

A plurality of fins arranged radially within the cavity may be also used for the guide of the jig according to the present invention.

The center axis of the cavity to be filled with the sealant and the center axis of the fastener member can be matched with each other by providing the plurality of fins.

The guide of the jig according to the present invention may be fixed to the cup, or removably attached to the cup.

In the jig according to the present invention, a handle may be preferably formed on the cup or the guide.

Removing operability of the jig can be improved by forming the handle.

The present invention provides a method for forming a sealant layer around a fastener member that passes through and fastens a plurality of members constituting an airframe of an aircraft by using the jig described above. The method includes: a step A of filling the cavity of the cup with the sealant; and a step B of mounting the cup filled with the sealant to the fastener member while the guide is engaged with the fastener member so as to match the center axis of the cavity with the center axis of the fastener member.

The method according to the present invention may preferably include a step C of filling an airspace formed by the cup and the guide with an uncured sealant after the step B.

A squeeze out can be prevented from being separated by filling the airspace formed by the cup with the uncured sealant. Arc can be completely sealed by filling the airspace formed by the guide.

Moreover, in the method according to the present invention, before the step B, a region around a portion of the fastener member to be insulated may be coated with another sealant having lower viscosity than the sealant to be fed in the cup.

When the cup is mounted to the fastener member, generation of voids in the sealant fed in the cup can be suppressed by coating the region around the portion to be insulated with the sealant having lower viscosity in advance.

A lightning protection fastener on which the sealant layer is formed in the aforementioned manner is typically used in a wing of an aircraft.

In accordance with the present invention, the sealant layer having a required thickness can be quickly and accurately formed around the faster member by mounting the cup filled with the sealant to the fastener member determined in position by using the guide.

DETAILED DESCRIPTION OF THE PREFERRED EMBODIMENTS

In the following, preferred embodiments of the present invention are described by reference to the accompanying drawings.

First Embodiment

FIGS. 1A to 1F are views for explaining a method for forming a sealant layer for a lightning protection fastener according to a first embodiment.

In the first embodiment, a sealant layer 29 having a required thickness (see FIGS. 2A to 2D) is formed around a fastener member 24 by using a guide jig 30. In the present invention, a bolt may be used instead of a pin-shaped fastener body 25, and a nut meshing with the bolt may be used instead of a collar 26 so as to constitute the fastener member. That is, the fastener member according to the present invention has a concept in which one of the members includes a shank portion, and the other of the members includes a fixture mounted to the shank portion in any specific form.

Figure 1A:
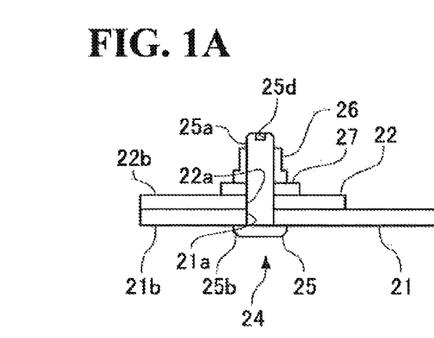
FIGS. 1A to 1F are views for explaining a first step and a second step in a first embodiment.

As shown in FIG. 1A, the fastener member 24 in the first embodiment joins a wing panel 21 (a first member) and a reinforcement structural member 22 (a second member). In FIG. 1A, an outer surface 21$b$ of the wing panel 21 indicates an outer portion of a wing, and an inner surface 22$b$ of the reinforcement structural member 22 indicates an inner portion of the wing.

The fastener member 24 includes the pin-shaped fastener body 25, the collar (a fixture member) 26 that is mounted to a shank portion 25$a$ of the fastener body 25 on an inner side of the wing, and a washer 27.

The fastener body 25 and the collar 26 are generally made of a metal material such as titanium alloy, inconel, and stainless steel in view of strength. The fastener body 25 includes the shank portion 25$a$, and a head portion 25$b$ that is located at one end portion of the shank portion 25$a$ and has a larger outer diameter than the shank portion 25$a$. A recess 25$d$ is also formed in a distal end surface of the shank portion 25$a$. The recess 25$d$ is a depression provided so as to be engaged with a distal end of a guide rod 37 described below. For example, the recess 25$d$ may be formed as a head portion of a hexagon socket head bolt and double as a hole into which a tightening tool is inserted. The following embodiments are aimed at fasteners, including bolts, with a nominal diameter in a range of about 5/32 inches to 9/16 inches, for example.

The washer 27 has an annular shape with a predetermined thickness, and is normally made of a metal material. When the metal material is used for the washer 27, stainless steel, aluminum or the like are used.

A coating is normally applied to a surface of the metal member such as the fastener body 25, the collar 26, and the washer 27. For example, when an anodized coating is applied, anticorrosion properties are maintained, and lubricity in tightening is improved. When a conductive chemical coating is applied, anticorrosion properties are maintained, and conductivity is improved so as to prevent occurrence of arc and improve static electricity removal performance.

When the washer 27 is made of an insulating material, arc discharge can be more effectively prevented from occurring in an interface between the reinforcement structural member 22 and the washer 27. However, the strength is lowered. It is thus necessary to make consideration of structural design. When the insulating material is used for the washer 27, resin having insulating properties, such as PPS (polyphenylene sulfide resin), polyimide, PEEK (polyether ether ketone resin), and nylon resin, is preferably used.

The fastener body 25 is inserted from the outer surface 21$b$ of the wing panel 21 into holes 21$a$ and 22$a$ respectively formed so as to pass through the wing panel 21 and the reinforcement structural member 22. A distal end portion is caused to project into the wing from the inner surface 22$b$ of the reinforcement structural member 22 with the head portion 25$b$ at a proximal end portion abutted against a peripheral surface of the hole 21$a$.

In this state, the distal end portion of the fastener body 25 projects longer into the wing than the collar 26. It is necessary to form the sealant layer 29 made of an insulating material on an entire peripheral surface of the fastener member 24 projecting into the wing so as to prevent occurrence of arc. If the sealant layer 29 does not have a predetermined thickness for ensuring lightning protection capability, that is, if the arc preventing means has insufficient performance and arc occurs by lightning current on a contact surface between the fastener member 24 and another peripheral member, the arc may not be sealed. The arc itself, or hot particles generated from the arc may destroy the sealant layer 29 to blow out, come into contact with flammable fuel vapor, and thereby cause ignition. The sealant layer 29 is destroyed when a bulk portion of the sealant tears or melts, or when the sealant layer 29 is separated at a close contact surface between the sealant layer 29 and the inner surface 22b of the reinforcement structural member 22 to cause the hot particles to blow out. The required thickness of the sealant layer 29 is, for example, about 0.8 mm to 3.0 mm since the thickness needs to be set so as to sufficiently withstand the magnitude of lightning current flowing through each fastened portion. The required thickness differs in respective portions even around the same fastener member 24. For example, while the thickness at the outer periphery of the fastener member 24 is required to be 2.5 mm, the thickness around the recess 25d close to the collar 26 of the fastener member 24 is 0.8 mm or, in some cases, may be less than 0.8 mm.

When the sealant layer 29 is formed, it is necessary to prevent generation of voids within the sealant layer 29 as much as possible. If there are a lot of voids in the sealant layer 29, the arc sealing performance is reduced, and the lightning protection capability is also deteriorated. Since there are a great number of fastener members 24 in the wing of an aircraft, it is necessary to reduce a time required for forming the sealant layer 29 for each of the fastener members 24.

Thus, the first embodiment proposes a method for quickly and accurately forming the sealant layer 29 having a required predetermined thickness by use of a guide jig 30. The method is performed on the fastener member 24, the assembly of which is completed except for the sealant layer 29.

Figure 1B:
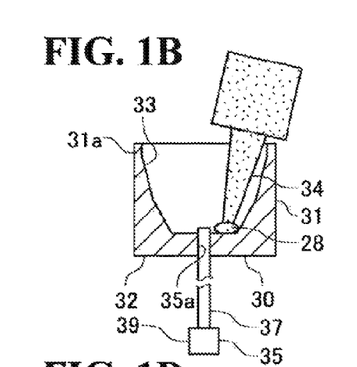
Figure 1C:
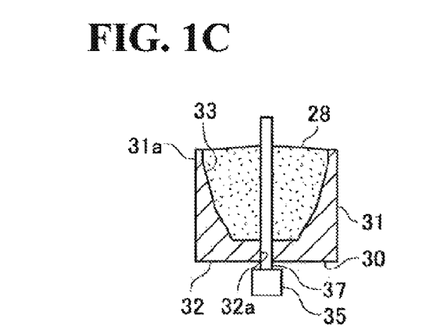

As shown in FIGS. 1B and 1C, the guide jig 30 includes a cup 31 including a cavity 33 filled with an uncured sealant 28, and a guide pin 35 that determines a position of the cup 31 with respect to the fastener member 24.

To form the sealant layer having a required thickness, the cavity 33 needs to have an outer diameter and a depth enough to ensure the required thickness with respect to an outer diameter and a projecting length of the fastener member 24. A study on this point is described in detail later. It is a premise that the sealant 28 for coating does not become insufficient. To this end, the sealant 28 is fed so as to fully fill the cavity 33 of the cup 31 in principle. In some cases, however, the amount of the sealant 28 in the cavity 33 is reduced as described later.

The required thickness may not be obtained only by identifying the outer diameter and the depth of the cavity 33, and the amount of the sealant 28 fed into the cavity 33. That is, the required thickness may not be obtained when a center axis of the cavity 33 and a center axis of the fastener member 24 are not matched with each other. It means that the center axis of the cavity 33 may be laterally displaced, or may be inclined.

Thus, the guide jig 30 includes the guide pin 35 so as to match the center axes of the cavity 33 and the fastener member 24.

The cup 31 has a cylindrical shape. The cavity 33 of the cup 31 forms an axisymmetric rotating body with respect to the center axis of the fastener member 24. Therefore, when the center axes of the cavity 33 and the fastener member 24 are aligned, a distance from the center axis to an inner wall surface of the cup 31 defining the cavity 33 can be made circumferentially even at any axial position. The cup 31 opens in the cavity 33 on one axial end side, and is closed by a ceiling portion 32 on the other axial end side.

The outer diameter and the depth of the cavity 33 are determined in order to form the sealant layer 29 having a required thickness for ensuring the lightning protection capability of the fastener member 24 as described above. The sealant layer 29 to be formed needs to have a sufficient thickness in consideration of shrinkage of the sealant by 10% to 20% of the thickness when the sealant layer is cured, and various manufacturing tolerances. However, when the sealant layer 29 is set to a thickness larger than the required thickness, the total weight of the aircraft is increased, thereby affecting fuel consumption. Thus, the outer diameter of the cavity 33 of the cup 31 is preferably set to a diameter determined according to a following procedure. First, a thickness obtained by adding a value of 10% to 20% of the required thickness to the required thickness of the sealant layer is calculated. Subsequently, a thickness twice as large as the above thickness is calculated. Lastly, a value obtained by adding the outer diameter of the fastener member 24 and various manufacturing tolerances to the thickness calculated as above is calculated, and the value is employed as the outer diameter of the cavity 33.

To be more specific, when the required sealant thickness is 2.5 mm, a value twice as large as a value obtained by adding 20% of the required thickness is 6.0 mm. A manufacturing tolerance of 1.0 mm and a maximum tolerance of the washer position from the fastener body position are added to 6.0 mm. The value obtained as above is employed as the outer diameter of the cavity 33. The depth of the cavity 33 is preferably set to a depth obtained by (1)+(2)+(3):

(1) the projecting length of the fastener body 25,
(2) the thickness obtained with 10% to 20% of the required thickness added to the required thickness of the sealant layer, and
(3) tolerances of the projecting length of the fastener body 25 and the depth of the cavity 33.

The diameter of the cavity 33 is increased toward the opening portion in accordance with the outer shape of the fastener member 24. Thus, a bottom portion 31a of the cup 31 is thin. If the bottom portion 31a is thick, a footprint of the cup 31 becomes larger. Thus, a larger flat portion is correspondingly required in the inner surface 22b of the reinforcement structural member 22. It is then necessary to make the reinforcement structural member 22 larger than required in structural design, thereby increasing the weight of the aircraft. Therefore, it is more preferable that the bottom portion 31a is thinner. However, if the bottom portion 31a is too thin, the cup 31 is easily deformed, so that the sealant layer 29 having a desired thickness may not be formed, and it also becomes difficult to perform an operation of feeding the sealant as described below. The thickness of the bottom portion 31a is preferably set to 0.5 mm to 2.0 mm.

The cup 31 is made of fluorine resin. This is to improve release properties in removing the cup 31 from the sealant layer 29 as described below.

A guide hole 32a is formed in the cup 31 so as to pass through the ceiling portion 32. The guide pin 35 is inserted into the guide hole 32a. The guide hole 32a is formed coaxially with the center axis of the cavity 33. A thickness of the ceiling portion 32 and a tolerance of a diameter of the guide hole 32a are respectively set such that the inserted guide pin 35 is not inclined with respect to the axis. To be more specific, the thickness of the ceiling portion 32 is preferably 2.0 mm to 4.0 mm, and more preferably, 3.5 mm to 4.0 mm. The diameter of the guide hole 32a preferably has a tolerance in a range of +0.05 mm to +0.20 mm, and more preferably has a tolerance in a range of +0.10 mm to +0.15 mm with respect to an outer diameter of the guide rod 37 described below of the inserted guide pin 35.

The guide pin 35 can be freely attached to and detached from the cup 31. The guide pin 35 is preferably made of PPS (polyphenylene sulfide resin) or fluorine resin in view of the release properties of the sealant 28. Metal such as brass and aluminum may be also used so as to improve durability.

Although described in detail below, the guide pin 35 is arranged coaxially with the fastener member 24 while penetrating the ceiling portion 32 of the cup 31, so that the center axis of the cavity 33 and the center axis of the fastener member 24 are matched with each other.

The guide pin 35 includes the guide rod 37 and a handle 39 provided at a proximal end of the guide rod 37.

The guide rod 37 is a cylindrical member that is set to such an outer diameter as to be inserted into the guide hole 32*a* with no gap therebetween. The distal end of the guide rod 37 is inserted into the recess 25*d* of the fastener member 24. Accordingly, the guide pin 35 is arranged coaxially with the fastener member 24. A maximum outer diameter of the inserted guide rod 37 is set to be smaller than a minimum inner diameter of the recess 25*d* of the fastener member 24 by 0.05 mm.

The handle 39 is set to a larger diameter than the guide rod 37 so as to facilitate operation of the guide pin 35.

Steps for forming the sealant layer 29 having a required predetermined thickness around the fastener member 24 by using the aforementioned guide jig 30 are described. The steps include a first step to a third step.

[First Step: FIGS. 1B to 1C]

The first step is a step of filling the cavity 33 of the guide jig 30 with the sealant 28.

Before the step, a region around a portion filled with and forming the sealant 28, and various jigs are cleaned.

The sealant 28 is supplied from a sealing gun 34. A high-viscosity polysulfide polymer material generally used for a fillet seal or a fastener seal within a thick tank, e.g., PR-1776M B-2 Class B Low Weight Fuel Tank Sealant manufactured by PRC-Desoto Inc. is used as the sealant 28. It is preferable to use a sealant with few voids therein as the sealant 28 fed in the sealing gun 34 in advance.

As shown in FIG. 1B, the distal end of the guide rod 37 is inserted into the guide hole 32*a* so as to close the guide hole 32*a* before the sealant 28 is fed. The sealant 28 is sequentially supplied from the side of the ceiling portion 32 of the cavity 33 until the cavity 33 is fully filled. At this point, voids are generated if the sealant 28 traps air therein. Thus, it is necessary to carefully feed the sealant 28 so as not to trap air. The sealant 28 is basically fed until the cavity 33 is fully filled. However, a great amount of sealant may squeeze out depending on the shape of the fastener member 24 on which the sealant layer 29 is formed. Thus, the amount of the sealant 28 may be appropriately reduced. When reduced too much, the amount may not reach a required amount for forming the sealant layer 29, causing generation of voids. Thus, a reference line may be formed inside the cavity 33 in advance so as to indicate an appropriate amount for filling.

The guide pin 35 is pushed until its distal end projects from the sealant 28 after feeding the sealant 28 (FIG. 1C).

[Second Step: FIGS. 1D to 1F, FIG. 2A]

The second step is a step of mounting the guide jig 30 filled with the sealant 28 to the fastener member 24 with the center axes matched with each other.

Figure 1D:
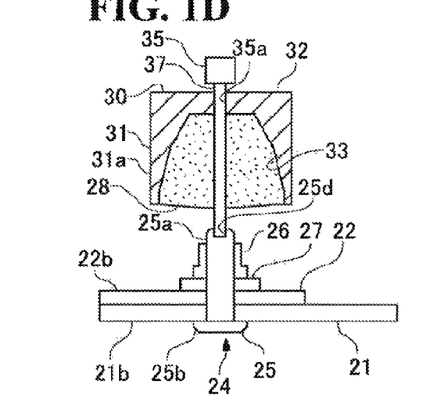

First, the guide jig 30 is roughly determined in position with respect to the fastener member 24. The distal end of the guide rod 37 projecting from the sealant 28 is then inserted into the recess 25*d* of the fastener member 24 (FIG. 1D). The center axis of the cavity 33 is thereby matched with the center axis of the fastener member 24.

Figure 1E:
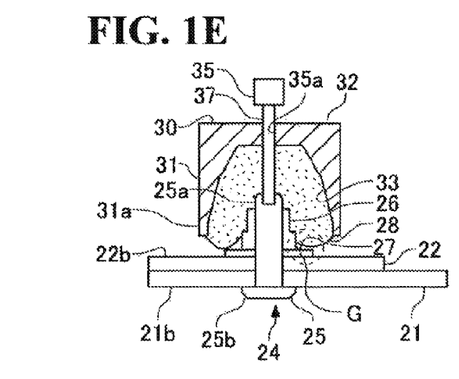
Figure 1F:
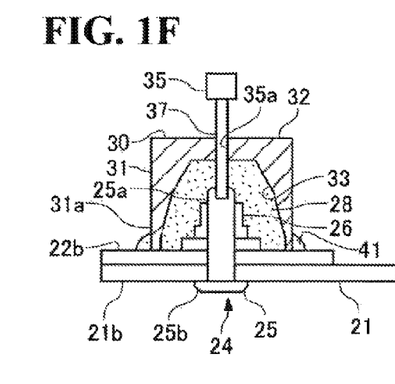

Subsequently, the cup 31 is pushed toward the fastener member 24 (FIG. 1E). Since the cup 31 is guided by the guide rod 37, the cavity 33 is maintained in a state in which its center axis is matched with the center axis of the fastener member 24 within a tolerance range. The cup 31 is pushed to an end at which the bottom portion 31*a* is in contact with the reinforcement structural member 22 (FIG. 1F). The sealant 28 thereby covers the entire periphery of the fastener member 24. At this point, the surface of the bottom portion 31*a* of the cup 31 is in close contact with the inner surface 22*b* of the reinforcement structural member 22. Thus, even when the center axis of the cavity 33 is displaced from the center axis of the fastener member 24 within a tolerance range, the displacement is corrected to be smaller. With the displacement prevented, the guide jig 30 is left as it is until the surface of the sealant 28 is not deformed (tack free) even when touched.

Through the above process, the sealant 28 spills out from the bottom portion 31*a* of the cup 31 by an amount corresponding to the volume of the fastener member 24 so as to form a squeeze out 41 (FIG. 1F). If the squeeze out 41 is too large, or has an irregular shape, the squeeze out 41 is corrected in shape, or partially removed.

Figure 2A:
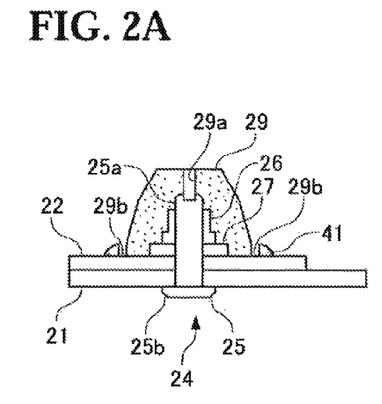
FIGS. 2A to 2D are views for explaining a third step in the first embodiment.

After a lapse of at least a time length (tack free time) in which the sealant 28 is cured such that its surface is not deformed even when touched, the guide jig 30 is removed as shown in FIG. 2A. The sealant 28 is further left until the sealant 28 is fully cured, so that the sealant layer 29 having a required thickness is formed around the fastener member 24.

However, an airspace portion 29*a* remains in a region corresponding to the guide rod 37, and an airspace portion 29*b* remains in a region corresponding to the bottom portion 31*a* of the cup 31. If the airspace portion 29*a* is left as it is, there is a risk that the arc cannot be fully sealed. If the airspace portion 29*b* is left as it is, there is a risk that the squeeze out 41 may be separated from the reinforcement structural member 22.

Figure 2B:
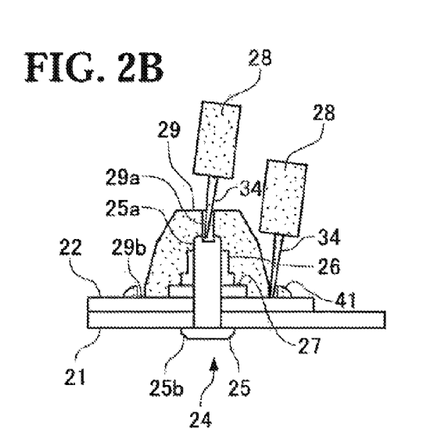
Figure 2C:
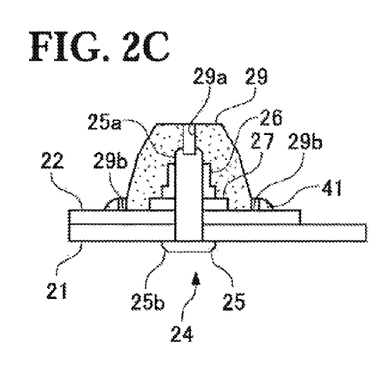
Figure 2D:
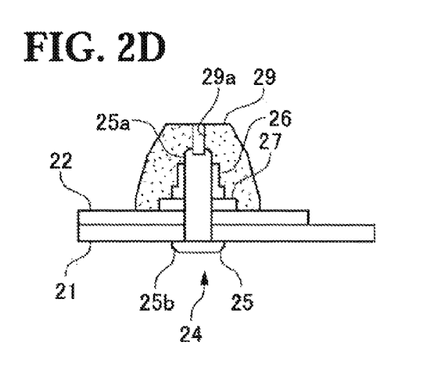

[Third Step: FIGS. 2B to 2D]

The third step is a step of filling the airspace portions 29*a* and 29*b* formed in the second step.

As shown in FIG. 2B, the sealant 28 is supplied to the airspace portion 29*a* from the sealing gun 34 so as to fully fill the airspace portion 29*a*. Similarly, the sealant 28 is supplied to the airspace portion 29*b*. The squeeze out 41 and the sealant layer 29 are thereby adhered via the sealant 28.

As to the airspace portion 29*b*, the squeeze out 41 may be removed (FIG. 2D).

Effects obtained by the method for forming a sealant layer according to the first embodiment by using the guide jig 30 are described.

In the first embodiment, the center axis of the cavity 33 filled with the sealant 28 and the center axis of the fastener member 24 are matched with each other. As a result, the sealant layer 29 having a required thickness for ensuring the lightning protection member 24.

The center axes of the cavity 33 and the fastener member 24 are matched by simply inserting the distal end of the guide pin 35 into the recess 25*d*. Thus, the sealant layer 29 can be quickly formed.

The cup 31 is pushed with an interval between the cavity 33 and the fastener member 24 evenly maintained. Thus, the sealant 28 fed in the cup 31 is supplied while being pushed out parallel to an axial direction of the fastener member 24 evenly around the fastener member 24. Therefore, the sealant 28 is quite unlikely to trap air therein from around the sealant 28. Generation of voids due to inclusion of air is thereby suppressed in the final sealant layer 29.

When the squeeze out 41 is formed over the entire periphery of a rim portion of the cup 31, it means that the sealant 28 spreads to the entire periphery of the fastener member 24. It is thus possible to visually determine that the sealant 28 spreads to the entire periphery of the fastener member 24 so as to prevent the generation of voids by confirming whether the squeeze out 41 is formed.

The guide jig 30 is removed after the sealant 28 becomes tack-free. Thus, the sealant layer 29 does not lose its shape in the middle of curing. Damage or attachment of foreign objects to a surface of the sealant layer 29 is thereby suppressed.

Modification of the First Embodiment

In a present modification, means for further suppressing the generation of voids by use of two types of sealants is described. Differences from the aforementioned first embodiment are mainly described.

In the present modification, a sealant 28A having low viscosity and a sealant 28B having higher viscosity than the sealant 28A are used as the sealant 28. The sealant 28 in the first embodiment corresponds to the sealant 28B having higher viscosity. A low-viscosity polysulfide polymer material generally used for a brush seal within a tank, e.g., PS-890A-2 Class A Fuel Tank Sealant manufactured by PRC-Desoto Inc. is used as the sealant 28A.

Figure 3A:
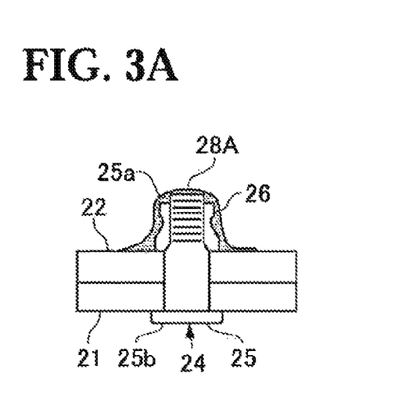
FIGS. 3A to 3G are views for explaining steps for forming a sealant layer in a modification of the first embodiment.
Figure 3B:
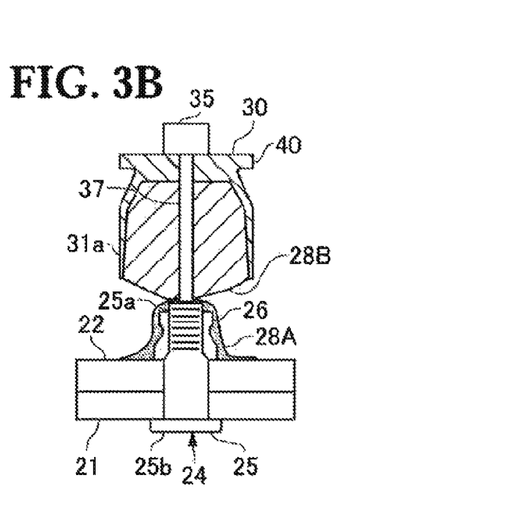
Figure 3C:
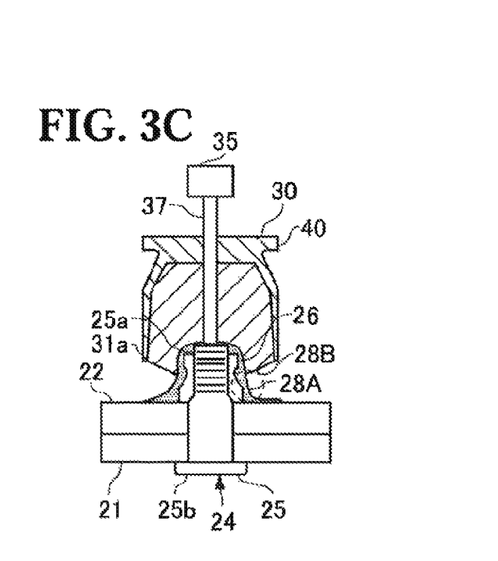
Figure 3D:
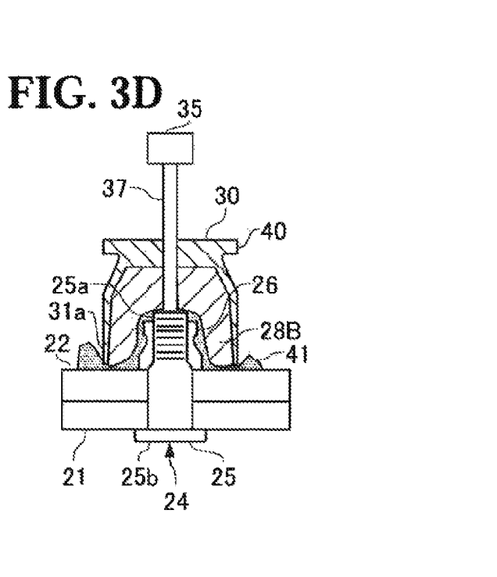
Figure 3E:
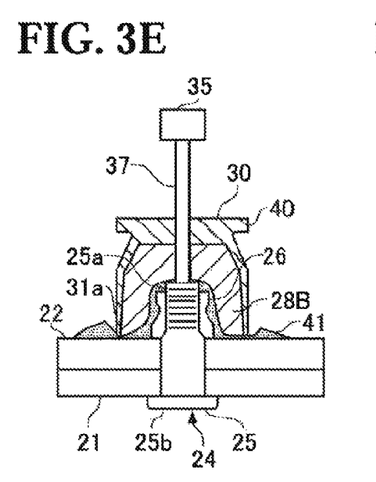

[Zero Step: FIG. 3A]

In a zero step, after the region around the portion filled with and forming the sealant and the various jigs are cleaned, the sealant 28A is applied to a region around the fastener member 24 as shown in FIG. 3A before mounting the guide jig 30 filled with the sealant 28B (first step). The sealant 28A may be applied by using, for example, a brush. At this point, the sealant 28A is applied within a range of about an outer diameter of the guide jig 30.

[First Step]

In a first step of the present modification, the sealant 28B is fed into the guide jig 30 before mounting the guide jig 30 to the fastener member 24 in a similar manner to the first step described in the first embodiment.

[Second Step: FIGS. 3B to 3F]

Subsequently, as shown in FIGS. 3B to 3E, the sealant 28B is supplied to the entire peripheral surface of the fastener member 24 by the guide jig 30. In a similar manner to the first embodiment, the distal end of the guide rod 37 is fitted to the recess 25d to thereby match the center axes. The cup 31 is then pushed toward the reinforcement structural member 22 along the guide pin 35 so as to form the squeeze out 41 by causing the sealant 28B to spill out to the entire periphery from the rim portion of the cup 31. The sealant 28B is thereby supplied to the entire peripheral surface of the fastener member 24 to which the sealant 28A has been applied.

At this point, since the sealant 28B has higher viscosity than the sealant 28A, the sealant 28B flows on the surface of the sealant 28A at a certain speed. Since the sealant 28A has lower viscosity than the sealant 28B, the sealant 28A flows on the surface of the fastener member 24 so as to be pushed out by the sealant 28B.

Figure 3F:
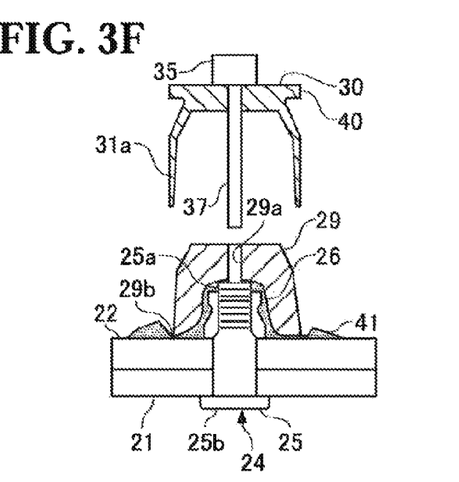

The bottom portion 31a of the cup 31 is put into contact with the reinforcement structural member 22. The guide jig 30 is removed when the sealant 28A and the sealant 28B are cured so as to become tack-free (FIG. 3F). When removed, the guide jig 30 is slowly removed by holding a handle 40 that is provided at an upper end of the guide jig 30 so as to facilitate the removal. Since the guide jig 30 is made of Teflon® resin, the sealant layer 29 has favorable release properties from the guide jig 30. In addition thereto, the handle 40 is also provided, so that the guide jig 30 can be easily removed without damaging the sealant layer 29, and deteriorating adhesiveness between the sealant layer 29 and the reinforcement structural member 22. The handle 40 is set to a thickness of, for example, 2 mm to 4 mm, preferably, about 3 mm. Accordingly, the handle 40 is not deformed or damaged. It is also possible to prevent the guide jig 30 from increasing in size beyond a working space.

Figure 3G:
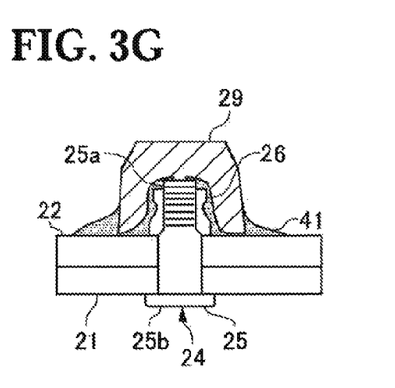

[Third Step: FIG. 3G]

In a third step, the airspace portions 29a and 29b are processed by using the sealant 28B in a similar manner to the third step described in the first embodiment.

Actions and effects of suppressing voids according to the modification are described by reference to FIGS. 6A to 6D.

Figure 6A:
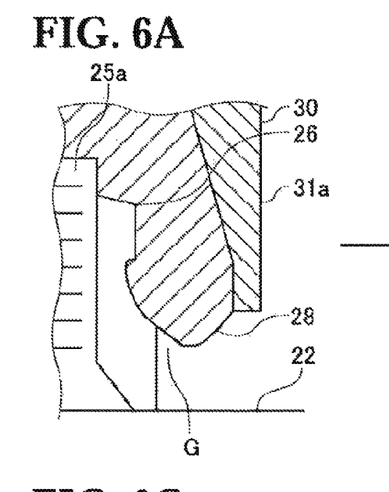
FIGS. 6A to 6D are views for explaining an effect of using two types of sealants.
Figure 6B:
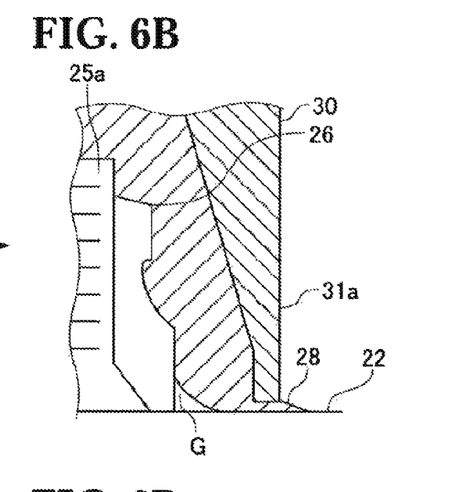

When only the sealant 28 (the sealant 28B) is used as in the first embodiment, the sealant 28 in the vicinity of the fastener member 24 (the collar 26) is difficult to flow due to friction against the fastener member 24 (the collar 26). As a result, the sealant 28 contacts the fastener member 24 (the collar 26) at an acute angle at a lower end portion, thereby forming a gap G as shown in FIG. 6A. When the guide jig 30 is further pushed, the sealant 28 squeezes out with the gap G left behind. In this case, air is trapped in the gap G to form a void (FIG. 6B). The gap G is easily formed in some cases, and not easily formed in other cases depending on the viscosity of the sealant 28, the required thickness of the sealant layer 29, the size of a gap between the cavity 33 of the cup 31 and the fastener member 24, and the shape of the fastener 24. That is, the present modification needs to be applied in some cases, and does not need to be applied in other cases depending on the situations.

Figure 6C:
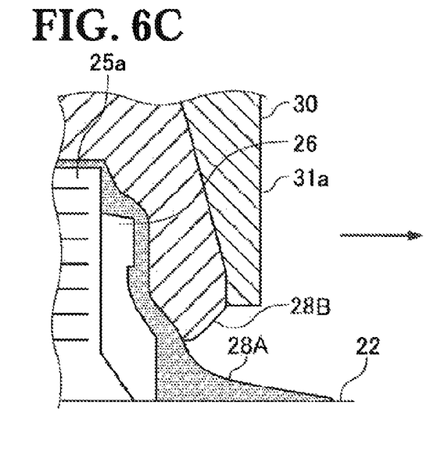
Figure 6D:
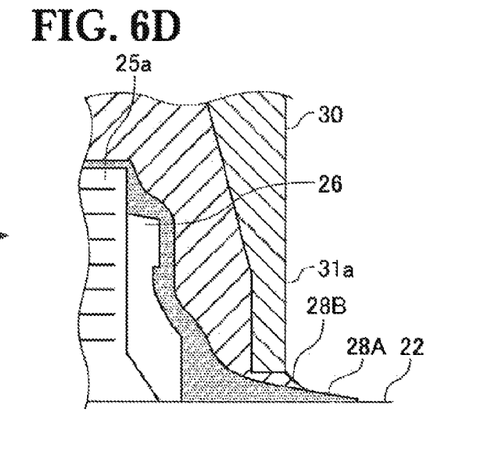

Meanwhile, when the sealant 28A having low viscosity is applied in advance, the sealant 28A easily flows in the vicinity of the fastener member 24, and also fills a depression in the surface of the fastener member 24 (the collar 26) since the sealant 28A is pushed out by the sealant 28B. Moreover, since the sealant 28A acts as a lubricant, the sealant 28B can flow so as to slide on the surface of the sealant 28A. Accordingly, the contact angle of the sealant 28B with the fastener member 24 (the collar 26) at the lower end portion is kept obtuse (FIG. 6C). When the guide jig 30 is further pushed, the sealant 28B flows on the surface of the sealant 28A to squeeze out while forming no gap (FIG. 6D). Accordingly, the generation of voids can be suppressed by applying the sealant 28A to the fastener member 24 in advance.

The viscosity of the sealant 28A is appropriately selected so as to obtain the aforementioned actions and effects.

Second Embodiment

The method for forming the sealant layer 29 on the fastener member 24 on the side to which the collar 26 is mounted has been described in the first embodiment.

On the other hand, when the head portion 25b of the fastener member 24 is at a position in contact with fuel and arc may occur at the position, the head portion 25b also needs to be covered with an insulating layer (sealant layer).

In a second embodiment, a method for forming the sealant layer 29 on the head portion 25b of the fastener member 24 by using a guide jig 50 is described by reference to FIGS. 4A to 5D.

The guide jig 50 used in the second embodiment is used for forming the sealant layer 29 around the head portion 25b.

Figure 4A:
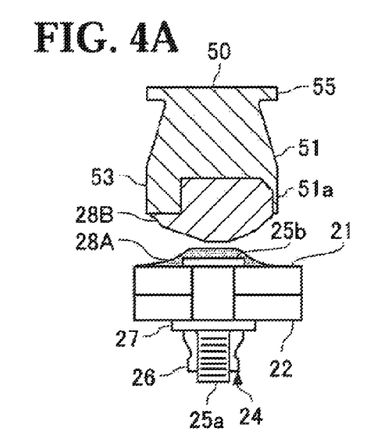
FIGS. 4A to 4E are views for explaining a first step and a second step in a second embodiment.
Figure 4B:
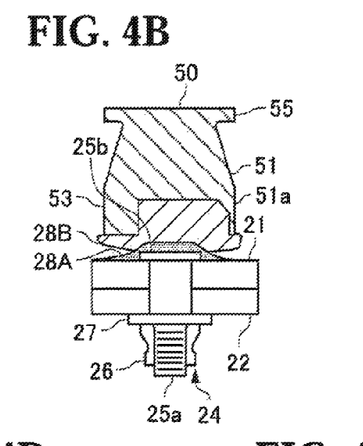
Figure 4C:
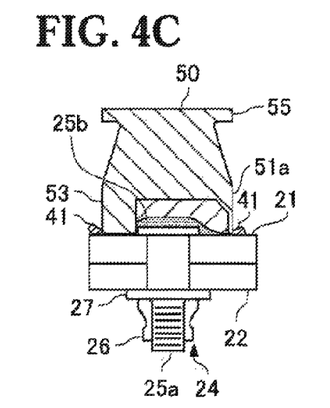
Figure 4D:
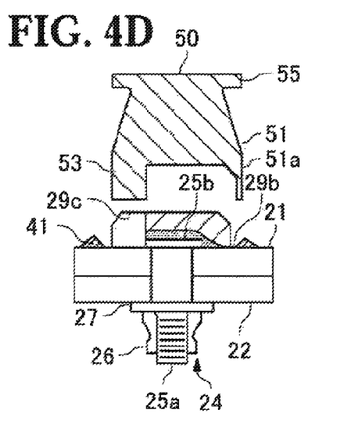
Figure 4E:
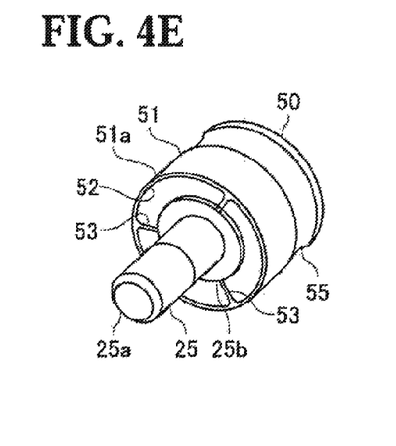

As shown in FIG. 4E, the guide jig 50 includes a cylindrical cup 51 that is closed at one end, a cavity 52 filled with the sealant 28, and a plurality of guide fins 53 arranged radially within the cavity 52.

For example, the cup 51 is made of fluorine resin. A flange 55 is provided along the outer periphery at an upper end of the cup 51.

The guide fins 53 extend toward a center axis from an inner periphery of the cup 51. In this example, three guide fins 53 are provided at regular intervals in a circumferential direction. Distal ends of the three guide fins 53 on the center axis side are arranged on a circumference having a diameter equal to the outer diameter of the head portion 25b. That is, when the head portion 25b is fitted to a virtual circle formed by the three guide fins 53, the head portion 25b is grasped by the three guide fins 53. At this point, the center axis of the head portion 25b (the fastener member 24) and the center axis of the cup 51 are matched with each other.

The guide fins 53 may be freely attached to and detached from the cavity 52. The number of the guide fins 53 is any number no less than three. Four or more guide fins may be provided. As to the distal ends of the guide fins 53 on the center axis side, it is preferable that the guide fins 53 are formed in a tapered shape, and the distal ends are set to a thickness of about 0.5 mm to 2.0 mm and become gradually thicker in a depth direction such that a sealant feeding operation described below is quickly and easily performed without generating voids in a contact point with the head portion 25b.

Next, steps for forming the sealant layer 29 on the head portion 25b by using the aforementioned guide jig 50 are described.

[Zero Step]

In a similar manner to the modification of the first embodiment (FIG. 3A), the sealant 28A having lower viscosity than the sealant 28B fed in the guide jig 50 is applied to an entire peripheral surface of the head portion 25b by using a brush or the like (see FIG. 4A).

[First Step]

The sealant 28B is fed into the cavity 52 before mounting the guide jig 50 to the fastener member 24.

[Second Step: FIGS. 4A to 4D]

Subsequently, the guide jig 50 filled with the sealant 28B is determined in position such that the center axis of the guide jig 50 and the center axis of the head portion 25b of the fastener body 25 are roughly matched with each other (FIG. 4A). The guide jig 50 is then pushed toward the head portion 25b while being kept parallel to the outer surface 21b of the wing panel 21 (FIG. 4B). Accordingly, the three guide fins 53 provided in the guide jig 50 grasp the head portion 25b, so that the center axis of the head portion 25b and the center axis of the guide jig 50 are matched with each other (FIG. 4C).

After the guide jig 50 is pushed until abutted against the wing panel 21, the guide jig 50 is left as it is until the sealants 28A and 28B become tack-free with the guide jig 50 prevented from being displaced.

After the lapse of the time length in which the sealant 28 is cured so as to become tack-free, the guide jig 50 is removed. Accordingly, the sealant layer 29 having a required thickness is formed around the head portion 25b.

When removed, the guide jig 50 is slowly removed by holding the flange 55 that is provided at the upper end of the guide jig 50 so as to facilitate the removal. However, an airspace portion 29c remains in a region corresponding to the guide fins 53, and an airspace portion 29b remains in a region corresponding to a bottom portion 51a of the cup 51 (FIG. 4D).

[Third Step: FIGS. 5A to 5D]

Thus, in a third step, the airspace portions 29b and 29c are filled as described below.

Figure 5A:
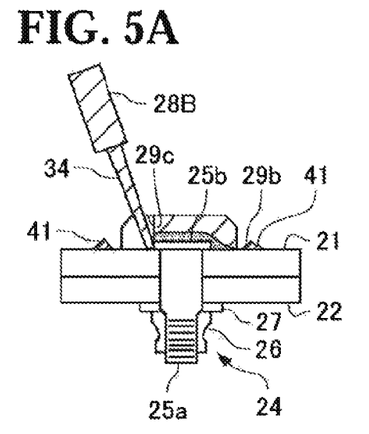
FIGS. 5A to 5D are views for explaining a third step in the second embodiment.
Figure 5B:
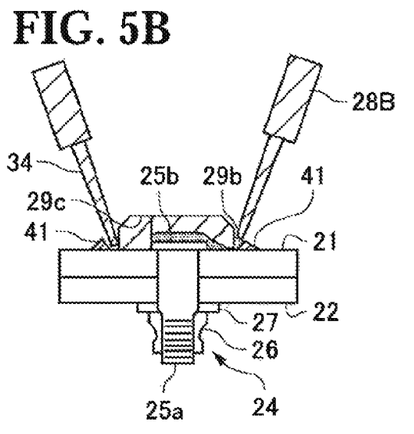
Figure 5C:
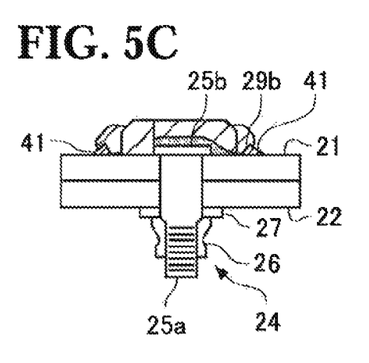
Figure 5D:
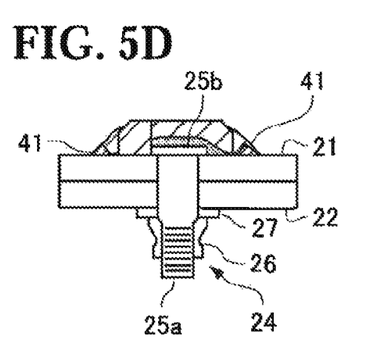

First, the sealant 28B is supplied to the airspace portion 29c formed in the region corresponding to the guide fins 53 from the sealing gun 34 so as to fill the airspace portion 29c (FIGS. 5A and 5C). The sealant 28B starts to be supplied with the sealing gun 34 abutted against the outer periphery of the head portion 25b of the fastener 24. When the sealant 28B starts to come out, the sealing gun 34 is slowly retracted. Voids can be thereby prevented from being generated in the sealant 28B in the airspace portion 29c. The sealant 28B is also supplied to the airspace portion 29b formed in the region corresponding to the bottom portion 51a so as to fill the airspace portion 29b (FIGS. 5B and 5C). After supplied, the sealant 28B is smoothed, thereby adhering the squeeze out 41 and the sealant layer 29 (FIG. 5D).

In accordance with the second embodiment, the center axis of the cavity 52 filled with the sealant 28B and the center axis of the head portion 25b can be accurately matched by grasping the head portion 25b by the guide fins 53 formed within the cup 51. As a result, the sealant layer having a required thickness for ensuring the lightning protection capability can be accurately obtained around the head portion 25b.

The operation of matching the center axes of the cavity 52 and the head portion 25b is performed simply by grasping the head portion 25b by the guide fins 53. Accordingly, the sealant layer 29 can be quickly formed.

The generation of voids can be also suppressed by using the sealants 28A and 28B having different viscosity in a similar manner to the first embodiment. Since the distal ends of the guide fins 53 contact the head portion 25b, the sealant 28A in the airspace portion 29c is thinner than that in another portion due to the guide fins 53. However, the sealant 28A still exists, so that the outer periphery of the head portion 25b is made smooth. The generation of voids can be thereby suppressed. Of course, the guide jig 50 can be applied to a case in which the sealant 28A is not used.

Although the embodiments according to the present invention have been described above, the constitutions in the aforementioned embodiment may be also freely selected or appropriately changed into other constitutions without departing from the scope of the present invention.

For example, in the first embodiment, the distal end of the guide rod 37 is inserted into the recess 25d of the fastener member 24. However, the distal end of the guide rod 37 may be determined in position so as to surround the distal end of the fastener body 25.

In the second embodiment, the example in which the sealant layer 29 is formed on the head portion 25b is described. However, the sealant layer 29 may be formed on the fastener body 25 by using the guide jig 50 including the guide fins 53.

What is claimed is:

1. A method for producing a lightning protection fastener with an insulating sealant layer, the lightning protection fastener comprising:

a fastener member that passes through and fastens a plurality of members constituting an airframe of an aircraft; and an insulating sealant layer that is formed around the fastener member, with a jig comprising:

a cup including a cavity to be filled with an uncured sealant; and a guide that is provided within the cavity and engaged with the fastener member of the lightning protection fastener so as to match a center axis of the cavity with a center axis of the fastener member, performing the method comprising:

a step A of filling the cavity of the cup with the sealant; and a step B of mounting the cup filled with the sealant to the fastener member while the guide is engaged with the fastener member so as to match the center axis of the cavity with the center axis of the fastener member.

2. The method according to claim 1, further comprising a step C of filling an airspace formed by the cup and the guide with an uncured sealant after the step B.

3. The method according to claim 1, wherein before the step B, a region around a portion of the fastener member to be insulated is coated with another sealant having lower viscosity than the sealant to be fed in the cup.

\* \* \* \* \*